US011218297B1

(12) United States Patent
Hegg et al.

(10) Patent No.: US 11,218,297 B1
(45) Date of Patent: Jan. 4, 2022

(54) ONBOARDING ACCESS TO REMOTE SECURITY CONTROL TOOLS (71) Applicant: Tripwire, Inc., Portland, OR (US)

(72) Inventors: Joshua Hegg, Portland, OR (US);
Devon Gleeson, Portland, OR (US);
Brian McFeely, Orinda, CA (US);
Craig Meinschein, Portland, OR (US);
Guy Gascoigne-Piggford, Portland, OR (US); Jack Truong, Portland, OR (US)

(73) Assignee: Tripwire, Inc., Portland, OR (US)

( * ) Notice: Subject to any disclaimer, the term of this patent is extended or adjusted under 35 U.S.C. 154(b) by 252 days.

(21) Appl. No.: 16/434,028

(22) Filed: Jun. 6, 2019

Related U.S. Application Data

(60) Provisional application No. 62/681,625, filed on Jun. 6, 2018.

(51) Int. Cl.
*H04L 29/00* (2006.01)
*H04L 9/08* (2006.01)
*H04L 29/06* (2006.01)
*G06F 21/62* (2013.01)
*H04L 9/32* (2006.01)

(52) U.S. Cl.
CPC .......... *H04L 9/083* (2013.01); *G06F 21/6218* (2013.01); *H04L 9/0825* (2013.01); *H04L 9/3263* (2013.01); *H04L 63/166* (2013.01)

(58) Field of Classification Search
CPC ..... H04L 9/083; H04L 9/0825; H04L 9/3263; H04L 63/166; G06F 21/6218
See application file for complete search history.

(56) References Cited

U.S. PATENT DOCUMENTS

| 7,243,348 | B2 | 7/2007 | Good et al. |
| 7,316,016 | B2 | 1/2008 | DiFalco |
| 7,360,099 | B2 | 4/2008 | DiFalco et al. |
| 7,587,754 | B2 | 9/2009 | DiFalco et al. |
| 7,620,715 | B2 | 11/2009 | DiFalco et al. |
| 7,765,460 | B2 | 7/2010 | DiFalco et al. |
| 7,822,724 | B2 | 10/2010 | DiFalco et al. |
| 8,140,635 | B2 | 3/2012 | DiFalco |
| 8,176,158 | B2 | 5/2012 | DiFalco et al. |
| 8,819,491 | B2 | 8/2014 | Whitlock et al. |
| 9,634,951 | B1 | 4/2017 | Hunt et al. |
| 9,667,619 | B1 * | 5/2017 | Vera-Schockner ......... H04L 63/0428 |
| 9,741,017 | B2 | 8/2017 | Good et al. |
| 9,766,873 | B2 | 9/2017 | Steigleder |

(Continued)

*Primary Examiner* — Mahfuzur Rahman
(74) *Attorney, Agent, or Firm* — Klarquist Sparkman, LLP (57) ABSTRACT

Disclosed below are representative embodiments of methods, apparatus, and systems for managing one or more cybersecurity tools that are deployed to help protect electronic assets in an IT infrastructure—including, for example, one or more security configuration management tools, vulnerability management tools, event logging tools, or other IT infrastructure security or monitoring tools that are used to monitor, secure, and/or control assets in an IT infrastructure. In one example, a request to install local software for access to a remote security control service is received from a remote user at a remote device; and data for installing the local software is transmitted to the remote user. In certain implementations, the data for installing the local software further includes a public cryptographic certificate.

19 Claims, 6 Drawing Sheets

(56) References Cited

U.S. PATENT DOCUMENTS

| | | |
|---|---|---|
| 10,158,660 B1 | 12/2018 | Reguly et al. |
| 10,313,257 B1 | 6/2019 | Hunt et al. |
| 10,318,894 B2 | 6/2019 | DiFalco et al. |
| 10,382,486 B2 | 8/2019 | Rivers |
| 2002/0095522 A1* | 7/2002 | Hayko .................... H04L 67/42 719/311 |
| 2002/0196330 A1 | 12/2002 | Park et al. |
| 2004/0024843 A1 | 2/2004 | Smith |
| 2004/0075738 A1 | 4/2004 | Burke et al. |
| 2004/0122962 A1 | 6/2004 | DiFalco et al. |
| 2006/0035713 A1* | 2/2006 | Cockerille ............ G07F 17/323 463/42 |
| 2006/0206883 A1 | 9/2006 | Sabbouh |
| 2006/0242277 A1 | 10/2006 | Torrence et al. |
| 2007/0124255 A1 | 5/2007 | DiFalco et al. |
| 2007/0239862 A1 | 10/2007 | Bronez et al. |
| 2008/0016501 A1 | 1/2008 | Muhlestein et al. |
| 2008/0021912 A1 | 1/2008 | Seligman et al. |
| 2008/0168420 A1 | 7/2008 | Sabbouh |
| 2008/0189335 A1* | 8/2008 | Sikchi .................... G06F 16/10 |
| 2010/0005107 A1 | 1/2010 | DiFalco |
| 2010/0043066 A1 | 2/2010 | Miliefsky |
| 2011/0066951 A1 | 3/2011 | Ward-Karet et al. |
| 2011/0197094 A1 | 8/2011 | Wagner |
| 2011/0197189 A1 | 8/2011 | Wagner et al. |
| 2011/0197205 A1 | 8/2011 | Wagner et al. |
| 2011/0208841 A1 | 8/2011 | Robertson et al. |
| 2012/0023076 A1 | 1/2012 | Torrence et al. |
| 2012/0179805 A1 | 7/2012 | DiFalco |
| 2012/0210434 A1 | 8/2012 | Curtis et al. |
| 2012/0265655 A1* | 10/2012 | Stroh .................... G06Q 30/04 705/30 |
| 2013/0268357 A1* | 10/2013 | Heath .................... G06Q 30/02 705/14.53 |
| 2015/0180894 A1* | 6/2015 | Sadovsky ............... H04L 67/22 726/22 |
| 2019/0068622 A1* | 2/2019 | Lin ........................ G06F 21/552 |
| 2019/0386969 A1* | 12/2019 | Verzun .................. H04L 63/102 |

* cited by examiner

ONBOARDING ACCESS TO REMOTE SECURITY CONTROL TOOLS

CROSS-REFERENCE TO RELATED APPLICATIONS

This application claims the benefit of U.S. Provisional Application No. 62/681,625 entitled "OPERATIONS CENTER FOR MANAGING AND MONITORING INFORMATION-TECHNOLOGY SECURITY CONFIGURATION MANAGEMENT SYSTEMS" and filed on Jun. 6, 2018, which is hereby incorporated herein by reference in its entirety.

FIELD

This application relates generally to the field of managing and monitoring one or more cybersecurity tools that are used to monitor and manage electronic devices in an information technology ("IT") infrastructure.

SUMMARY

Disclosed below are representative embodiments of methods, apparatus, and systems for managing and monitoring one or more cybersecurity tools that are deployed to help protect electronic assets in an IT infrastructure—including, for example, one or more security configuration management tools, vulnerability management tools, event logging tools, or other IT infrastructure security or monitoring tools that are used to monitor, secure, and/or control assets in an IT infrastructure.

As cybersecurity becomes increasingly important to small and large enterprises, it also becomes increasingly important to provide easier deployment mechanisms for those tools. For example, embodiments of the disclosed technology involve mechanisms for a linking an IT asset to a remote server that offers cybersecurity tools through a cloud-based software as a service ("SaaS") framework.

Further, it is also becoming increasingly important to ensure that an enterprise's cybersecurity tools are properly deployed, responsive, and functioning. The disclosed technology also helps address that need. In particular, this disclosure describes tools and techniques that help an IT administrator detect and understand any problems with the deployment of the various cybersecurity tools in the their IT systems and also help the IT administrator provide a record of the functioning of those tools that can be verified and/or available for an audit (e.g., to show compliance with any suitable government or industry standard, rule, or law). The disclosed tools and technique thereby improve the functioning of a computer system and the various computer-based assets in the system.

The disclosed methods, apparatus, and systems should not be construed as limiting in any way. Instead, the present disclosure is directed toward all novel and/or nonobvious features and aspects of the various disclosed embodiments, alone or in various combinations and subcombinations with one another.

DETAILED DESCRIPTION

I. General Considerations

The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used in various combinations and subcombinations with one another. For example, one or more method acts from one embodiment can be used with one or more method acts from another embodiment and vice versa. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "compare" to describe the disclosed methods. These terms may be high-level abstractions of the actual operations that are performed. The actual operations that correspond to these terms may vary depending on the particular implementation and are readily discernible by one of ordinary skill in the art. Additionally, as used herein, the term "and/or" means any one item or combination of items in the phrase.

II. Example Computing Environments for Implementing Embodiments of the Disclosed Technology Any of the disclosed methods can be implemented as computer-executable instructions stored on one or more computer-readable media (e.g., non-transitory computer-readable media, such as one or more optical media discs, volatile memory components (such as DRAM or SRAM), or nonvolatile memory components (such as hard drives)) and executed on a computer (e.g., desktop computers, servers, smart phones, tablet computers, netbooks, or other devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented (entirely or at least in part) by an integrated circuit (e.g., an application specific integrated circuit ("ASIC") or programmable logic device ("PLD"), such as a field programmable gate array ("FPGA")). The integrated circuit can be embedded in or directly coupled to an electrical device having a suitable display device.

Figure 1:
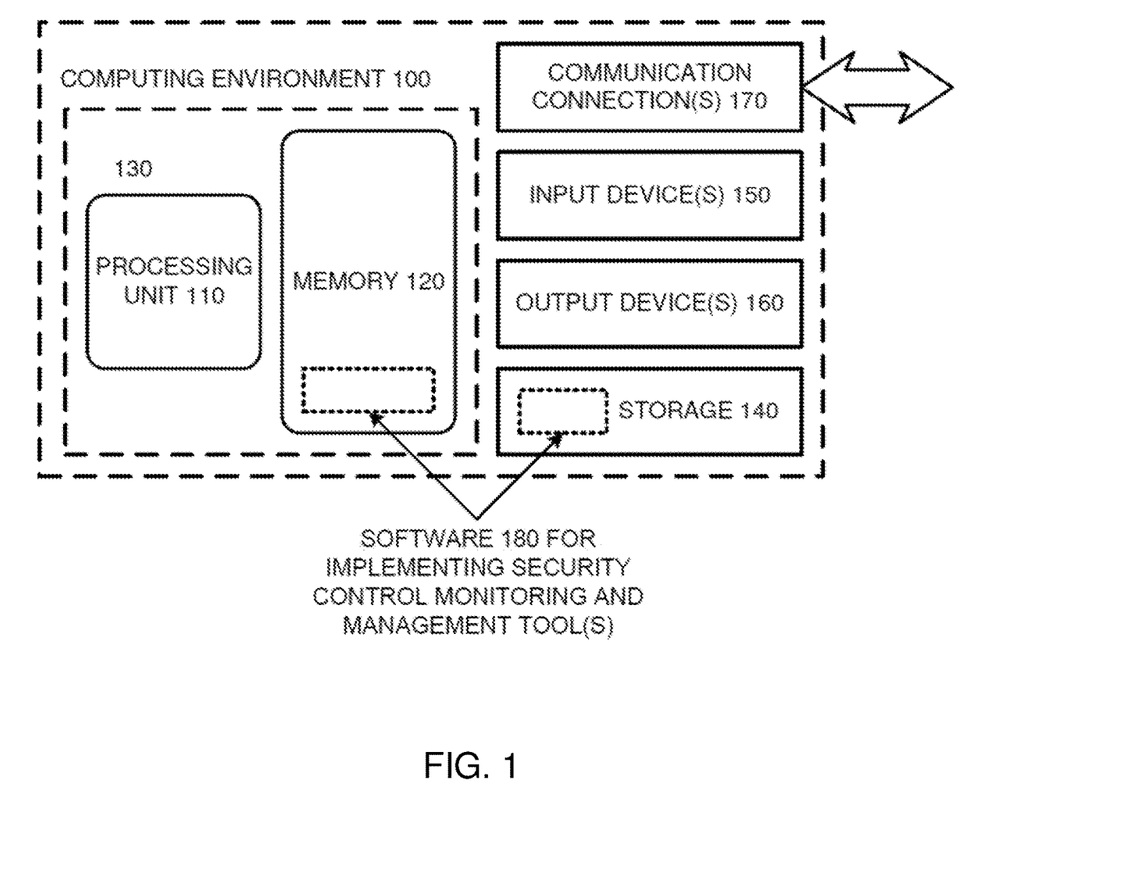
FIG. 1 is a block diagram illustrating a computing environment in which aspects of the disclosed technology can be performed.

FIG. 1 illustrates a generalized example of suitable computing hardware 100 with which several of the described embodiments can be implemented. The computing hardware 100 is not intended to suggest any limitation as to the scope of use or functionality of the disclosed technology, as the techniques and tools described herein can be implemented in diverse general-purpose or special-purpose environments that have computing hardware.

With reference to FIG. 1, the computing hardware 100 includes at least one processing unit 110 and memory 120. In FIG. 1, this most basic configuration 130 is included within a dashed line. The processing unit 110 executes computer-executable instructions. In a multi-processing system, multiple processing units execute computer-executable instructions to increase processing power. The memory 120 may be volatile memory (e.g., registers, cache, RAM), non-volatile memory (e.g., ROM, EEPROM, flash memory), or some combination of the two. The memory 120 stores software 180 for implementing one or more of the described embodiments. For example, the memory 120 can store software 180 for implementing any of the disclosed techniques described herein and their accompanying user interfaces.

The computing environment can have additional features. For example, the computing hardware 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 can be removable or non-removable, and includes magnetic disks, magnetic tapes or cassettes, CD-ROMs, DVDs, or any other such tangible non-transitory non-volatile memory or storage medium which can be used to store information and which can be accessed within the computing environment 100. The storage 140 can also store instructions for the software 180 implementing any of the described techniques, systems, or environments.

The input device(s) 150 can be a touch input device such as a keyboard, touchscreen, mouse, pen, trackball, a voice input device, a scanning device, or another device that provides input to the computing environment 100. The output device(s) 160 can be a display device (e.g., a computer monitor, smartphone display, tablet display, netbook display, or touchscreen), printer, speaker, CD-writer, or another device that provides output from the computing environment 100. Any of the disclosed user interfaces can be displayed on such display devices as part of an implementation of the disclosed technology.

The communication connection(s) 170 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods can be described in the general context of computer-readable instructions stored on one or more computer-readable media. Computer-readable media are any available media that can be accessed within or by a computing environment. By way of example, and not limitation, with the computing environment 100, computer-readable media include tangible non-transitory computer-readable media such as memory 120 and storage 140 but do not encompass transitory signals or carrier waves per se.

The various methods disclosed herein can also be described in the general context of computer-executable instructions, such as those included in program modules, being executed in a computing environment by a processor. Generally, program modules include routines, programs, libraries, objects, classes, components, data structures, and so on that perform particular tasks or implement particular abstract data types. The functionality of the program modules may be combined or split between program modules as desired in various embodiments. Computer-executable instructions for program modules may be executed within a local or distributed computing environment.

Figure 2:
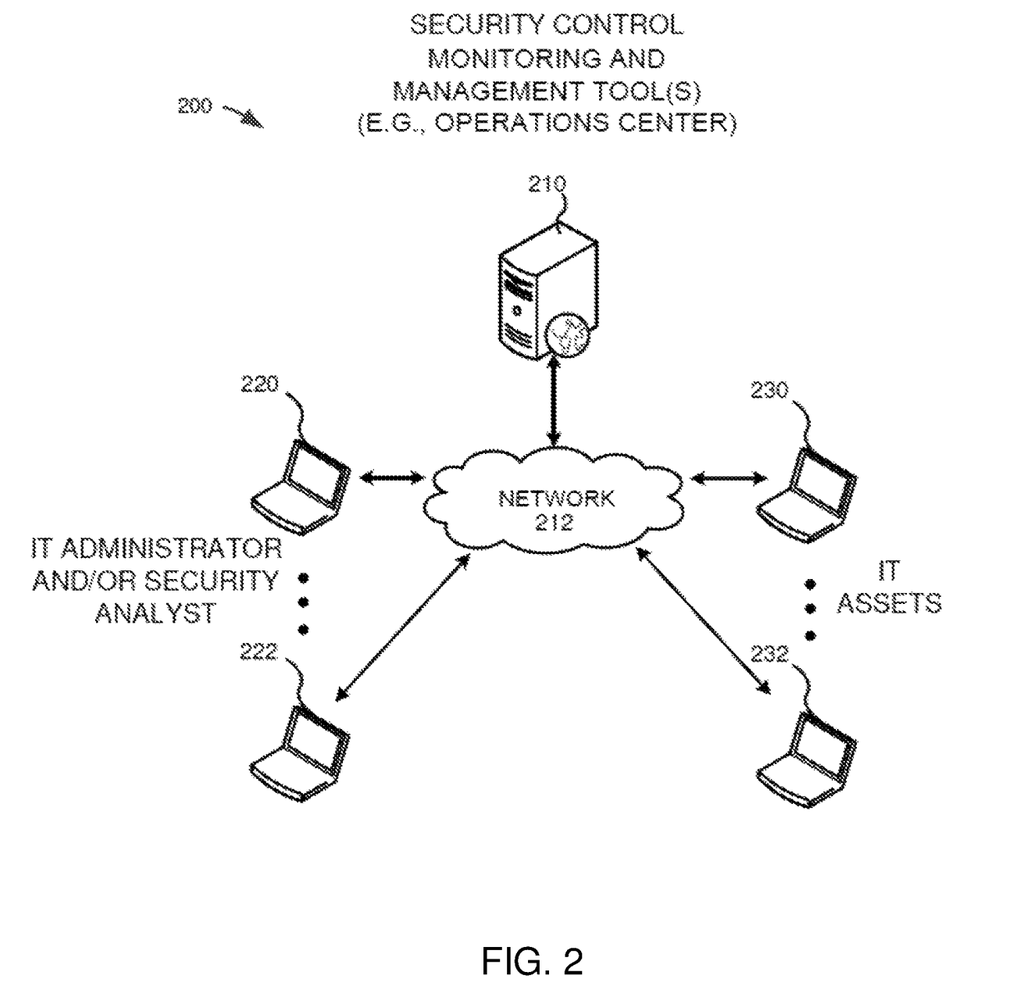
FIG. 2 is a block diagram showing a first exemplary network environment in which aspects of the disclosed technology can be performed.

An example of a possible network topology (e.g., a client-server network or cloud-based network) for implementing a system according to the disclosed technology is depicted in FIG. 2. Networked computing devices 220, 222, 230, 232 can be, for example, computers running a browser, plug-in, or other software that communicates with one or more central computers 210 (e.g., one or more servers in a cloud computing environment) via network 212. The computing devices 220, 222, 230, 232 and the central computer 210 can have computer architectures as shown in FIG. 1 and discussed above. The computing devices 220, 222, 230, 232 are not limited to traditional personal computers but can comprise other computing hardware configured to connect to and communicate with a network 212 (e.g., smart phones, tablets, or other mobile computing devices, servers, network devices, dedicated devices, and the like).

In the illustrated embodiment, the computing devices 220, 222, 230, 232 are configured to communicate with one or more central computers 210 via a network 212 (e.g., using a cloud network or other client-server network). In certain implementations, the central computers 210 execute software for performing any of the disclosed security control and/or visualization functionalities (e.g., display functionalities, onboarding functionalities, security data collecting functionalities, etc.). The central computers 210 can transmit data to any of the computing devices 220, 222. For example, the computing devices 220, 222 (e.g., computing devices associated with an IT administrator, security analyst, or Chief Information Security Officer (CISO)) can receive data from the central computer 210 over the network 212. In order to provide the data, the one or more central computers 210 can receive and process data from the computing devices 230, 232 (e.g., computing devices or other devices associated with assets or nodes in the IT infrastructure administered by the IT administrator, security analyst, or CISO), which can store and/or transmit various types of configuration data and security data used by the IT administrator, security analyst, or CISO. For example, the computing devices 230, 232 may store device configuration data, compliance policy data, change data, security data, logging event data, vulnerability assessment data, and/or other such data used by an IT compliance and configuration control tool (e.g., via a software agent). Alternatively, the one or more central computers 210 may themselves store the device configuration data, compliance policy, security, logging event, vulnerability assessment, and other such IT data.

Figure 3:
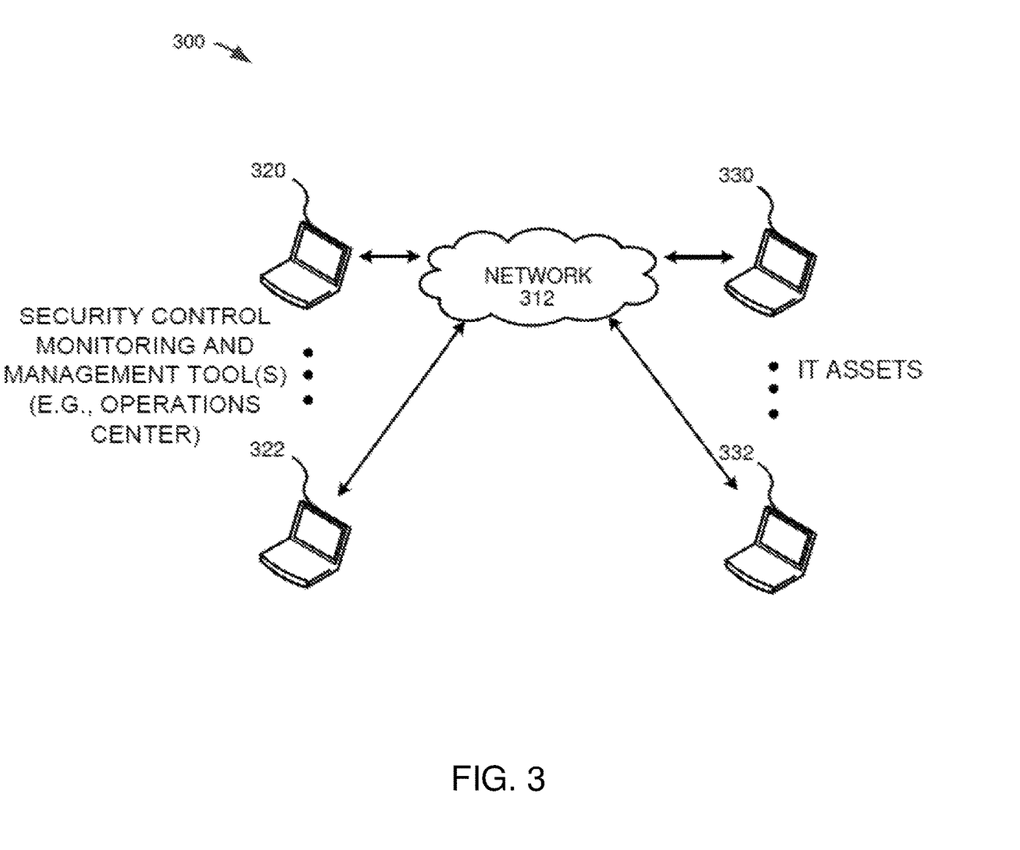
FIG. 3 is a block diagram showing a second exemplary network environment in which aspects of the disclosed technology can be performed.

Another example of a possible network topology for implementing a system according to the disclosed technology is depicted in FIG. 3. Networked computing devices 320, 322, 330, 332 can be, for example, computers running a browser or other software connected to a network 312. As above, the computing devices 320, 322, 330, 332 can have computer architectures as shown in FIG. 1 and discussed above. The computing devices 320, 322, 330, 332 are not limited to traditional personal computers but can comprise other computing hardware configured to connect to and communicate with a network 312 (e.g., smart phones, tablets, or other mobile computing devices, servers, network devices, dedicated devices, and the like).

In the illustrated embodiment, the computing devices 320, 322 are configured to communicate directly with computing devices 330, 332 via the network 312. In the illustrated embodiment, the computing devices 320, 322 execute software for implementing any of the disclosed security control and/or visualization functionalities (e.g., display functionalities, onboarding functionalities, security data collecting functionalities, etc.). The computing devices 320, 322 can use data obtained from the computing devices 330, 332 via the network 312. Any of the data received from the devices 330, 332, can be stored or displayed on any of the computing devices 320, 322 (e.g., displayed as data on a graphical user interface or web page at the computing devices 320, 322).

In the illustrated embodiments, the illustrated networks 212, 312 can be implemented as a Local Area Network ("LAN") using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the networks 212, 312 can be the Internet or a similar public network and operate using an appropriate protocol (e.g., the HTTP protocol).

III. Introduction to Security Control Tools that can be Monitored and Managed by the Disclosed Technology The disclosed technology can be used as part of (or in connection with) an IT management infrastructure for managing and monitoring one or more IT assets. In this disclosure, assets are also referred to as "nodes" or "devices". The IT nodes (assets or devices) can comprise, for example, servers, desktops, directory servers, hypervisors, databases, middleware applications, network devices, virtual infrastuctures, and/or other such electronic assets. In particular embodiments, the IT management infrastructure comprises one or more security control tools (sometimes illustrated herein as a "TE console"), which is a term encompassing one or more cybersecurity tools such as one or more of a security configuration management tool, a vulnerability management tool, or an event logging tool (which can be implemented separately from one another, as part of a single security control platform, or any combination thereof).

In general, a security configuration management ("SCM") tool can be used to detect, analyze, and report on change activity in an IT infrastructure. For example, the SCM tool can assess or receive configurations of the one or more nodes at one or more locations and detect and report changes to the configurations. Further, as part of its secure configuration monitoring functionality (also referred to as just configuration monitoring) and for one or more of the monitored nodes, the SCM tool can compare an expected configuration value for a node to a stored security policy. For example, the SCM tool can determine whether the nodes comply with internal and/or external policies (e.g., government, regulatory, or third-party standards, such as Sarbanes-Oxley, HIPAA, ISO 27001, NIST 800, NERC, PCI, PCI-DSS, Basel II, Bill 198, CIS, DISA, FDCC, FFIEC, GCSx, GLBA, GPG 13, IBTRM, or other IT infrastructure compliance standards). The SCM tool can identify and validate changes to ensure these configurations remain in known and trusted states.

In particular implementations, the SCM tool also performs a change auditing functionality in which configuration changes from a previously stored baseline are detected. For example, the SCM tool can discover and profile assets, then capture a baseline of server file systems, desktop file system, directory servers, databases, virtual systems, middleware applications and/or network device configurations in a known good state. Ongoing integrity checks then compare the current states against these baselines to detect changes. The baseline state and current state can be represented as a hash of the monitored file or item (e.g., a SHA-type hash, MD5 hash, or other suitable crytographic hash). The SCM tool can also collect information used to reconcile detected changes, ensuring they are authorized and intended changes. The SCM tool can crosscheck detected changes with defined IT compliance policies (e.g., using policy-based filtering), with documented change tickets in a change control management ("CCM") system, with a list of approved changes, with automatically generated lists created by patch management and software provisioning tools, and/or against other desired and approved changes. This allows the SCM tool to automatically recognize desired changes and expose undesired changes. These detection and cross-checking functions are part of the SCM tool's security configuration monitoring function.

The SCM tool can also generate one or more reports concerning the monitored nodes showing a wide variety of information (e.g., compliance information, configuration information, usage information, etc.) The compliance-related reports generated by the SCM tool can, in some instances, comprise a score for a node that indicates the relative compliance status of the node as a numerical value in a range of possible values (e.g., a score of 1 to 100 or other such numeric or alphabetical range). The SCM tool can also apply a set of one or more tests to the nodes to evaluate the compliance status of one or more nodes. In such embodiments, the compliance-related reports generated by the SCM tool can include the number of devices that passed a particular test as well as the number of devices that failed the test.

Still further, the SCM tool can be configured to provide an audit reporting function in which an audit trail of configuration control activities is maintained for one or more selected assets, thereby simplifying any requirement to prove compliance. Further, the auditing can be performed at frequent intervals (e.g., daily or multiple times in a day, which is sometimes referred to herein as "real time") for the selected assets.

An exemplary SCM tool that is suitable for use as a security configuration management tool with the disclosed technology is the Tripwire® Enterprise tool available from Tripwire, Inc. The examples described below are sometimes shown or discussed as being used in connection with the Tripwire Enterprise tool. This particular usage should not be construed as limiting, however, as the disclosed technology can be adapted by those skilled in the art to help monitor and manage IT nodes using other compliance and configuration control tools as well.

As noted, the SCM tool may be used with one or more other software tools (e.g., as part of a bigger asset management platform), such as an event logging tool and/or a vulnerability management tool.

An event logging tool can be used to monitor and store detected change event data in an event log and/or transmit the event data as soon as it is detected or shortly after it is detected. Event logs typically comprise a list of activities and configuration changes at nodes of the IT network. One such event logging and management tool that is suitable for use with or adaptation to implement embodiments of the disclosed technology is the Tripwire® Log Center tool available from Tripwire, Inc. This particular usage should not be construed as limiting, however, as the disclosed technology can be used with other event logging tools for an IT environment.

A vulnerability management tool (also referred to as a vulnerability assessment tool) is typically configured to detect, analyze, and report on one or more security control issues for one or more of the assets. Further, the vulnerability management tool can measure and help manage security risks to the assets. The vulnerability management tool can itself perform an operation whereby networked assets are discovered and profiled (separate from the SCM tool). For instance, the vulnerability management tool can profile networked hosts, applications, services, vulnerabilities, and configurations in order to provide a risk management view of the assets separate from the SCM tool. The vulnerability management tool can also be configured to perform vulnerability scanning operations on internal networks and/or vulnerability scanning on outward-facing networks, such as scanning for web application vulnerabilities. As noted, example vulnerability management tools that are suitable for use with or adaptation to implement embodiments of the disclosed technology are the Tripwire® IP360 or Tripwire® WebApp360 vulnerability management tools available from Tripwire, Inc. The examples described below are sometimes shown as being used in connection with the Tripwire IP360 tool. This particular usage should not be construed as limiting, however, as the disclosed technology can be used with other vulnerability management tools for an IT environment.

Each of these example security control tools can provide one or more functions related to the security control of assets in an IT environment. Accordingly, such functions are sometimes referred to as "security controls". Further, it should be understood that a given security control tool may provide one or multiple security controls for one or more assets in their IT infrastructure. For example, the SCM tool can provide a configuration monitoring security control (as discussed above) as well as a change auditing security control (also discussed above), while the vulnerability management tool can provide a vulnerability assessment security control (as discussed), and the event logging tool can provide an event logging security control (as also discussed above).

IV. Example Embodiments of the Disclosed Technology

Disclosed herein are representative embodiments of methods, apparatus, and systems for monitoring and managing one or more security control tools using a centralized tool. The one or more security control tools can include, for example, one or more security configuration management (SCM) tools, vulnerability management tools, event logging tools, or other IT infrastructure security or monitoring tools that are used to monitor, secure, and/or control assets in an IT infrastructure. Further, in particular embodiments discussed below, one or more user interfaces are provided for computing and displaying information related to the deployment status and functional status of the monitored tools.

In particular, this disclosure describes tools and techniques that help an IT administrator detect and understand any problems with the deployment of the various cybersecurity tools in the their IT systems and also help the IT administrator provide a record of the functioning of those tools that can be verified and/or available for an audit (e.g., to show compliance with any suitable government or industry standard, rule, or law).

IV.A. Example Techniques for Onboarding

This section describes example techniques for onboarding (e.g., installing and configuring a data adapter process) one or more security control tools to be monitored and managed by a central tool (e.g., the operations center tool, as disclosed herein). The disclosed examples sometimes focus on monitoring and managing an SCM tool, but the underlying principles and techniques can be expanded to be used with other security control tools, such as vulnerability management tools, event logging tools, or other IT infrastructure security or monitoring tools that are used to monitor, secure, and/or control assets in an IT infrastructure. Further, in the disclosed examples, the SCM consoles are referred to as being Tripwire® Enterprise consoles. It should be understood, however, that this is by way of example only.

In the examples below, reference is made to example entities (Audrey, an example IT administrator, and Simon, an example IT supervisor) and uses the Tripwire® software platform as an example security control tool framework, but it should be understood that this is by way of example only, as the technology can be applied to any IT management tool. Further, in the embodiments described below, the security control services are provided in a cloud computing environment, and more particularly a cloud-based SaaS ("Software as a Service") offering in which a thin client accesses the desired security control services.

In the disclosed embodiments, "SaaS Product CA" refers to the self-signed key and certificate that The SaaS Product uses to sign the Data Adapter Client Auth. Keys when the Data Adapter makes certificate signing requests ("CSRs"); "SaaS Product TLS Cert" refers to the certificate used by the SaaS Product for TLS communications (connections initiated from Audrey's browser and from the Data Adapter will be presented with this cert); and "the Data Adapter Client Key/Cert" refers to the key and certificate presented by the Data Adapter when communicating with the SaaS Product; further, the certificate will be signed by the SaaS Product CA after the Data Adapter performs a CSR at registration.

IV.A.1. Creation of the Installation Bundle

In certain embodiments, one or more web pages are provided (e.g., via a SaaS user interface) for configuring and downloading a file ("The Installation Bundle") that Audrey can hand to Simon for installing a properly-configured Data Adapter. Audrey is able to select which Product she wants to create a Data Adapter for (e.g., Tripwire Enterprise ("TE") (an example security configuration management tool) or Tripwire IP360 ("IP360") (an example vulnerability management tool), etc.). Audrey can then select which platform she wants an installer for. Audrey can then be presented with a form where she will enter the information necessary for that Product—for instance: TE Console hostname and port.

In some embodiments, the UI includes a button (e.g., a "Generate" button) that, when clicked, causes the SaaS to generate all the items needed to create a properly-configured Data Adapter Installation Bundle, and the browser will download it. Audrey can transmit that to Simon to install.

The Installation Bundle's file name will have the TE Console's hostname in it, so that Audrey and Simon can easily tell which Installation Bundle is meant for each host.

IV.A.2. Installation Bundle Details

In particular embodiments, the Installation Bundle is trivial for Simon to install, requiring no knowledge from Simon of details of the SaaS or the TE Console. For instance, the bundle can be a Data Adapter installer that installs a Data Adapter that is properly configured to talk to the SaaS Product and to the TE Console. The Installation Bundle can be, for example, a .zip file containing the Data Adapter installer plus a .zip of configuration files and data files that Simon will unzip over the installed Data Adapter. In particular example implementations, Simon (the IT supervisor) will unzip the Installation Bundle, run the installer, unzip the .zip file containing configuration and data files IV.A.3. Data Adapter Onboarding When the Data Adapter initially starts, it will connect to the SaaS Product to request to be onboarded. It will send information about itself and about the TE instance it is attempting to talk with (in the form of certificates). At this point, the Data Adapter is in a list of TE Consoles waiting to be approved. In particular implementations, Audrey is notified (e.g., via email, text, alert, or otherwise). The Data Adapter will go into a mode of periodically querying the SaaS Product to see if it has been approved.

IV.A.4. Approving the Onboarding Request

Audrey will examine the onboarding request. She can look at the details of the Data Adapter identity, and the TE identity (information from the certificates). If she does not think that this is a legitimate Data Adapter or TE, she can reject the request, and it disappears from the list of outstanding onboarding requests, and maybe she has the option of emailing someone about the details of the request (since it might be a security issue).

If she thinks this is a legitimate Data Adapter, she can approve the request. Along with approval, she will need to pass along the service account credentials for the Data Adapter to use with TE.

IV.A.5. Finishing Onboarding

Once approved by Audrey, the SaaS Product will use its SaaS Product Data Adapter Client CA to sign the Data Adapter Client Cert. The certificate is made available on The SaaS Product's onboarding endpoint. The Data Adapter, which has been periodically checking the onboarding endpoint to be approved, will download: the newly-signed certificate, and store it in the key store that the Data Adapter uses for TLS communication with the SaaS Product, the TE credentials to use, and store it obfuscated on disk IV.A.6. Onboarded The Data Adapter is now onboarded, and can successfully authenticate using its Client Cert, since the SaaS Product will trust any client that uses a certificate signed by the SaaS Product Data Adapter Client CA.

On Audrey having to enter TE credentials when approving a Data Adapter: one might be able to figure out a way for Audrey to enter this when she creates the installer. This would require coming up with a solution for encrypting the data in the installer (since one doesn't want the installer to contain any secrets so that Audrey can easily share it with Simon), and then later decrypting from a secure, authenticated connection with the Tripwire SaaS Product.

IV.A.7. Data Adapter Configuration

In certain embodiments, the TE Data Adapter is configured with one or more of the following:

The hostname and port of the TE Console so the Data Adapter can connect to it, and the hostname will also be used in the DN of the TLS Client certificate;

The username and password for the TE Console service account that the Data Adapter will use to communicate with the TE Console; and/or The TLS certificate ("the SaaS Product TLS Cert"), so that the Data Adapter will trust the SaaS Product endpoint when the Data Adapter makes TLS connections to the SaaS Product (all communication with the SaaS Product is done via HTTPS). Note that this is the same cert that Audrey's browser will see.

IV.A.8. What the Data Adapter does at Initial Startup

The Data Adapter creates a keypair to use for TLS. The Data Adapter makes an "onboarding request" to the SaaS Product.

IV.A.9. What the User Needs to Know to Approve a Data Adapter

Onboarded Data Adapters are granted some access to the Tripwire SaaS Product data, and will receive the TE Console password, and will be able to see and act on the TE Console. So one desirably makes sure that only "real" and authorized Data Adapters get onboarded. To verify Data Adapters asking to be onboarded, Audrey can check:

The identity of the Data Adapter (at least the distinguished name ("DN") from the certificate that the Data Adapter presents); and/or The identity of the TE Console that the Data Adapter talks to.

IV.A.10. Validating a Data Adapter

In particular embodiments, the SaaS Product will need to validate that the TLS certificate that the Data Adapter presents has the correct hostname in the certificate's DN. The Data Adapter might also validate its own cert at startup.

IV.A.11. Authentication

Once onboarded, the Data Adapter can connect to the SaaS Product using a SaaS Product CA-signed certificate. The SaaS Product allows anyone presenting a SaaS Product CA-signed certificate entry into the SaaS Product. In particular embodiments, before being onboarded, the Data Adapter will only have a self-signed certificate, and will only be able to connect to the onboarding endpoint.

In further embodiments, the option includes that the Data Adapter installer includes temporary access token (only usable on onboarding endpoint), or Simon knows the SaaS Product credentials.

IV.B. Example Embodiments

Figure 4:
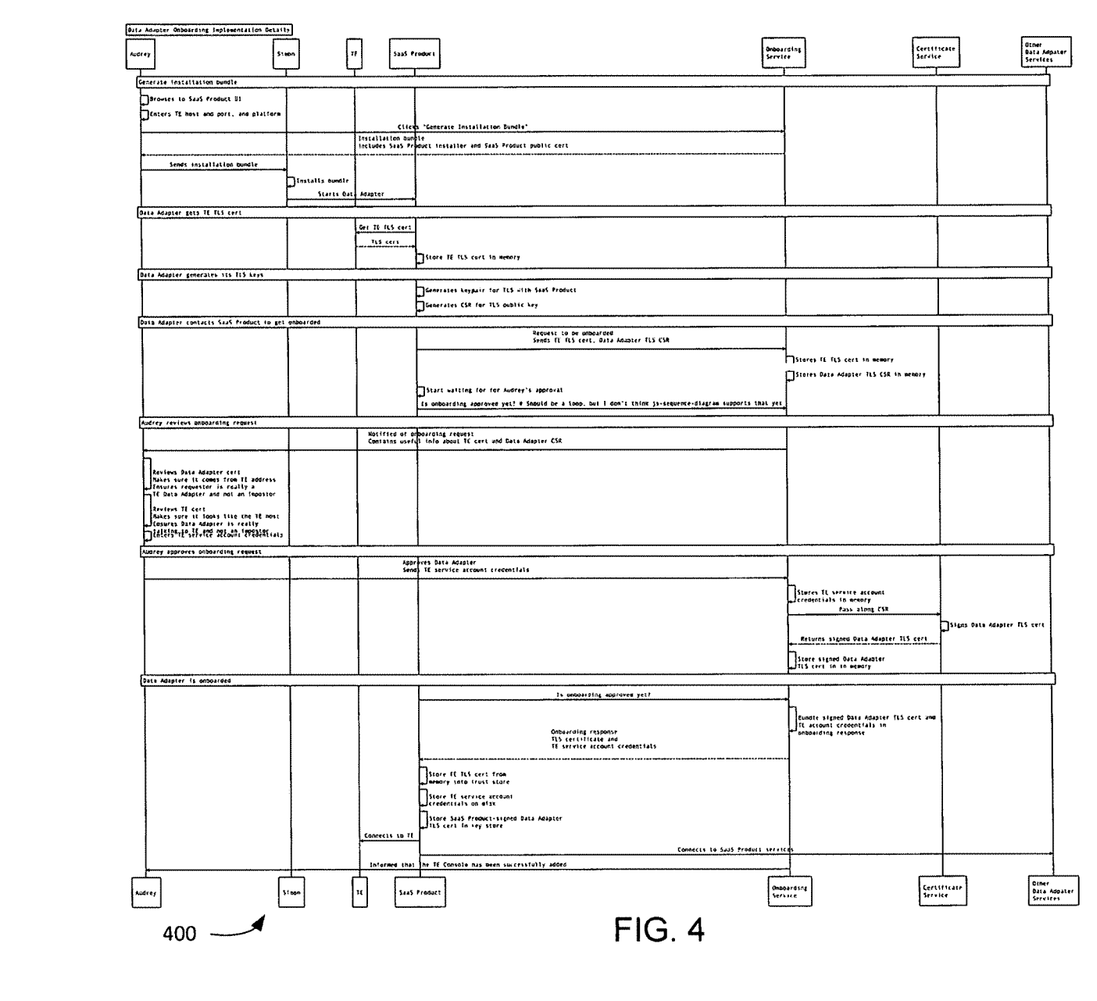
FIG. 4 is a detailed flowchart illustrating an example series of communications.
Figure 5:
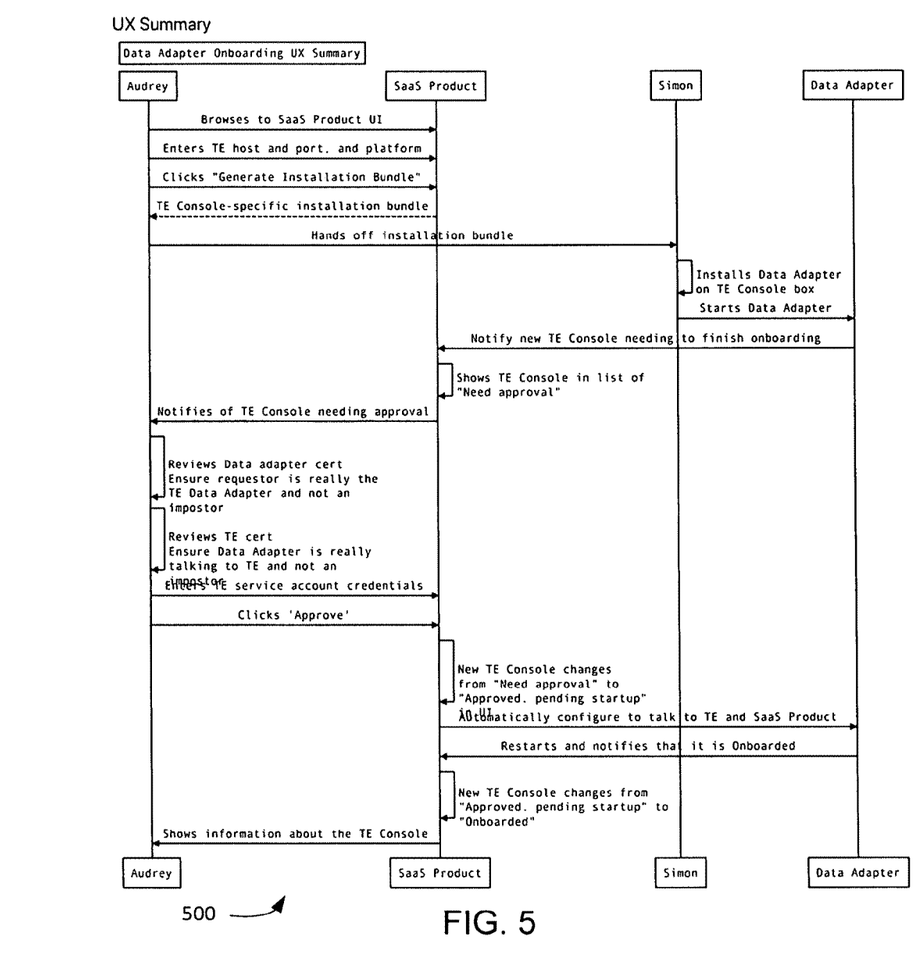
FIG. 5 is a further detailed flowchart illustrating the user interface experience of the communications in FIG. 4.

FIG. 4 is a detailed flowchart illustrating an example series of communications as described above. FIG. 5 is a further detailed flowchart illustrating the user interface experience of the communications in FIG. 4. The particular communications illustrated should not be construed as limiting, as the disclosed acts can be performed alone, in different orders, or at least partially simultaneously with one another. Further, any of the disclosed methods or acts can be performed with any other methods or acts disclosed herein.

Figure 6:
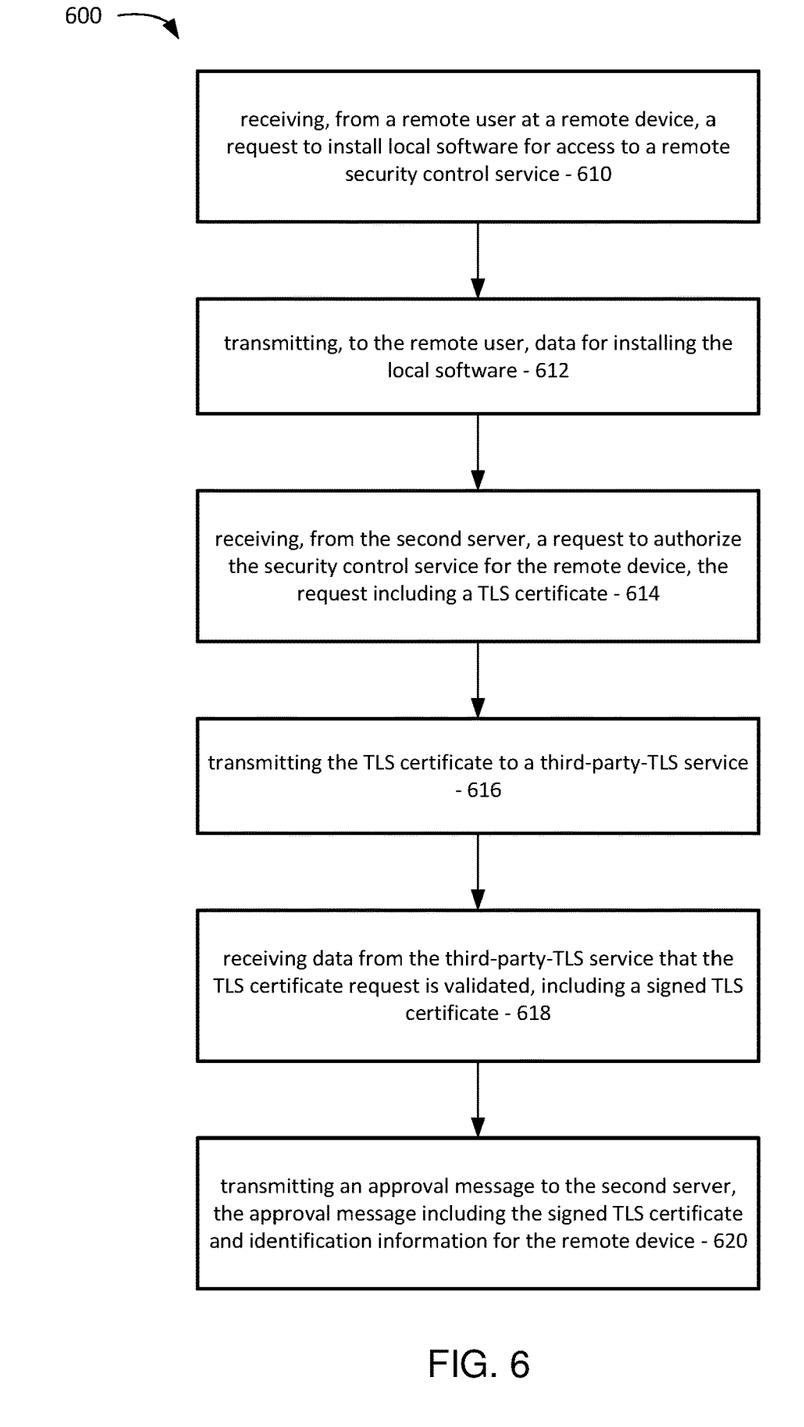
FIG. 6 is a flowchart illustrating a general embodiment of FIGS. 4 and 5 illustrating an example method of operating a multi-party, remote security configuration management service.

FIG. 6 is a flowchart illustrating a general embodiment of FIGS. 4 and 5 illustrating an example method of operating a multi-party, remote security control service. The particular embodiments described should not be construed as limiting, as the disclosed method acts can be performed alone, in different orders, or at least partially simultaneously with one another. Further, any of the disclosed methods or method acts can be performed with any other methods or method acts disclosed herein.

At 610, a request to install local software for access to a remote security control service is received from a remote user at a remote device.

At 612, data for installing the local software is transmitted to the remote user. In certain implementations, the data for installing the local software further includes a public cryptographic certificate. In some embodiments, a first server provides the data for installing the local software, and the remote security control service is provided by a second server separate from the first server.

At 614, a request to authorize the security control service for the remote device is received from the second server.

In particular implementations, the request to authorize the security control service for the remote device includes a transport layer security ("TLS") certificate request validatable by a third-party-TLS service.

And, at 616, the TLS certificate is transmitted to the third-party-TLS service.

At 618, data from the third-party-TLS service is received indicating that the TLS certificate request is validated. In the illustrated embodiment, the data includes a signed TLS certificate.

At 620, an approval message is transmitted to the second server. In the illustrated example implementation, the approval message includes the signed TLS certificate and identification information for the remote device.

In particular implementations, the remote security control service incudes periodic integrity checks that compare current states of files stored on the remote device against baseline states of the files in order to detect changes.

Concluding Remarks

Having illustrated and described the principles of the disclosed technology, it will be apparent to those skilled in the art that the disclosed embodiments can be modified in arrangement and detail without departing from such principles. For example, any one or more aspects of the disclosed technology can be applied in other embodiments. In view of the many possible embodiments to which the principles of the disclosed technologies can be applied, it should be recognized that the illustrated embodiments are only preferred examples of the technologies and should not be taken as limiting the scope of the invention.

What is claimed is:

1. A method of operating a multi-party, remote security configuration management service, comprising:

receiving, from a remote user at a remote device, a request to install local software for access to a remote security control service, the remote security control service including periodic integrity checks that compare current states of files stored on the remote device against baseline states of the files in order to detect changes; and transmitting, to the remote user, data for installing the local software.

2. The method of claim 1, wherein the data for installing the local software further includes a public cryptographic certificate.

3. The method of claim 1, wherein a first server provides the data for installing the local software, and wherein the remote security control service is provided by a second server separate from the first server.

4. The method of claim 3, further comprising:

receiving, from the second server, a request to authorize the security control service for the remote device.

5. The method of claim 4, wherein the request to authorize the security control service for the remote device includes a transport layer security ("TLS") certificate request validatable by a third-party-TLS service, and wherein the method further comprises transmitting the TLS certificate to the third-party-TLS service.

6. The method of claim 5, further comprising receiving data from the third-party-TLS service that the TLS certificate request is validated, including a signed TLS certificate.

7. The method of claim 6, further comprising transmitting an approval message to the second server, the approval message including the signed TLS certificate and identification information for the remote device.

8. One or more computer-readable storage devices storing computer-executable instructions which when executed by a computer cause the computer to perform a method, the method comprising:

receiving, from a remote user at a remote device, a request to install local software for access to a remote security control service, the remote security control service including periodic integrity checks that compare current states of files stored on the remote device against baseline states of the files in order to detect changes; and transmitting, to the remote user, data for installing the local software.

9. The one or more computer-readable storage devices of claim 8, wherein the data for installing the local software further includes a public cryptographic certificate.

10. The one or more computer-readable storage devices of claim 8, wherein a first server provides the data for installing the local software, and wherein the remote security control service is provided by a second server separate from the first server.

11. The one or more computer-readable storage devices of claim 10, further comprising:

receiving, from the second server, a request to authorize the security control service for the remote device.

12. The one or more computer-readable storage devices of claim 11, wherein the request to authorize the security control service for the remote device includes a transport layer security ("TLS") certificate request validatable by a third-party-TLS service, and wherein the method further comprises transmitting the TLS certificate to the third-party-TLS service.

13. The one or more computer-readable storage devices of claim 12, wherein the method further comprises receiving data from the third-party-TLS service that the TLS certificate request is validated, including a signed TLS certificate.

14. The one or more computer-readable storage devices of claim 13, further comprising transmitting an approval message to the second server, the approval message including the signed TLS certificate and identification information for the remote device.

15. A system, comprising:

a first server configured to provide onboarding services for remote security control services provided by a second server separate from the first server, the first server comprising a processor and one or more computer-readable storage devices, the one or more computer-readable storage devices storing computer-executable instructions which when executed cause the first server to perform a method, the method comprising:

receiving, from a remote user at a remote device, a request to install local software for access to the remote security control services, the remote security control services including periodic integrity checks that compare current states of files stored on the remote device against baseline states of the files in order to detect changes; and transmitting, to the remote user, data for installing the local software.

16. The system of claim 15, wherein the method further comprises receiving, from the second server, a request to authorize the security control service for the remote device.

17. The system of claim 16, wherein the request to authorize the security control service for the remote device includes a transport layer security ("TLS") certificate request validatable by a third-party-TLS service, and wherein the method further comprises transmitting the TLS certificate to the third-party-TLS service.

18. The system of claim 17, wherein the method further comprises receiving data from the third-party-TLS service that the TLS certificate request is validated, including a signed TLS certificate.

19. The system of claim 18, wherein the method further comprising transmitting an approval message to the second server, the approval message including the signed TLS certificate and identification information for the remote device.

* * * * *